United States Patent
Yoshida et al.

(10) Patent No.: US 6,504,674 B2
(45) Date of Patent: Jan. 7, 2003

(54) RECORDING DISK APPARATUS AND CLAMP THEREFOR

(75) Inventors: Mitsuaki Yoshida, Kawasaki (JP); Mitsuhiro Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/208,049

(22) Filed: Dec. 9, 1998

(65) Prior Publication Data

US 2001/0043431 A1 Nov. 22, 2001

(30) Foreign Application Priority Data

May 18, 1998 (JP) .......................................... 10-135062

(51) Int. Cl.$^7$ .......................... G11B 17/28; G11B 17/38
(52) U.S. Cl. .................................. 360/99.12; 360/98.08
(58) Field of Search ........................... 360/98.08, 99.05, 360/99.12; 369/270

(56) References Cited

U.S. PATENT DOCUMENTS

| | | | |
|---|---|---|---|
| 4,317,146 A | | 2/1982 | Gervais ........................... 360/98 |
| 4,561,035 A | * | 12/1985 | McDorman et al. ........ 360/137 |
| 4,864,443 A | * | 9/1989 | Peterson .................. 360/99.12 |
| 5,031,061 A | * | 7/1991 | Hatch ...................... 360/98.07 |
| 5,274,517 A | * | 12/1993 | Chen ....................... 360/98.08 |
| 5,490,024 A | * | 2/1996 | Briggs et al. ............. 360/99.12 |
| 5,528,434 A | * | 6/1996 | Bronshvatch et al. ..... 360/98.08 |
| 5,550,690 A | * | 8/1996 | Boutaghou et al. ...... 360/99.12 |
| 5,572,382 A | | 11/1996 | Kuno ....................... 360/98.08 |
| 5,790,345 A | * | 8/1998 | Alt .......................... 360/98.08 |
| 5,822,151 A | * | 10/1998 | Albrecht et al. ......... 360/98.08 |
| 5,912,784 A | * | 6/1999 | Bronshvatch et al. .... 360/98.08 |

FOREIGN PATENT DOCUMENTS

| | | | |
|---|---|---|---|
| EP | 429194 | 5/1991 | |
| EP | 573250 | 12/1993 | |
| GB | 2023257 | * 12/1979 | .............. 360/98.08 |
| GB | 2230891 | 10/1990 | |
| JP | 62-121955 | * 6/1987 | .............. 360/98.08 |
| JP | 547129 | 2/1993 | |
| JP | 5047129 | 2/1993 | |
| JP | 8-297910 | 11/1996 | |
| JP | 9-223346 | 8/1997 | |
| JP | 9-320160 | 12/1997 | |
| JP | 10-83601 | 3/1998 | |
| KR | 97-7074 | 2/1997 | |
| WO | 9513614 | 5/1995 | |

OTHER PUBLICATIONS

IBM Technical Disclosure Bulletin, Dickie et al, "Magnetic Disk Assembly", vol. 16, No. 11, p. 3763, Apr. 1974.*

* cited by examiner

*Primary Examiner*—David L. Ometz
(74) *Attorney, Agent, or Firm*—Greer, Burns & Crain, Ltd.

(57) ABSTRACT

A recording disk apparatus includes a recording disk supported by a rotation axis. A clamp is fixed at the tip end of the rotation axis by screws so as to urge the recording disk against a flange at the base end of the rotation axis. The screws are disposed along an imaginary circle concentric to the rotation axis so as to fix a plane body of the clamp at the tip end of the rotation axis. A rigidity reduction mechanism reduces rigidity of the plane body at an intermediate area relative to the screw bore areas, which intermediate area is defined between the screw bore areas along the imaginary circle. The rigidity reduction mechanism serves to suppress the undulation of the magnetic disk.

7 Claims, 5 Drawing Sheets

RECORDING DISK APPARATUS AND CLAMP THEREFOR

BACKGROUND OF THE INVENTION

1. Field of the Invention

The present invention relates to a recording disk apparatus such as a magnetic disk apparatus employed as an exterior storage device for a computer system.

2. Description of the Prior Art

A hard disk drive unit (HDD) representing a magnetic disk apparatus, for example, employs a magnetic disk surrounding a rotation axis which is driven by a spindle motor. When information is recorded or read out, the magnetic disk is driven for rotation with respect to a magnetic head.

The magnetic disk is fixed between a clamp and a flange formed on the rotation axis near the base end. The clamp is fixed at the tip end of the rotation axis so as to urge the magnetic disk against the flange.

In fixing the clamp on the rotation axis, a plurality of screws are employed to fix the plane body of the clamp at the tip end of the rotation axis. The screws are arranged on an imaginary circle concentric to the rotation axis. The plane body is urged strongly against the rotation axis in the screw bore areas, while the urging force is weakened in the intermediate areas between the screw bore areas along the imaginary circle.

Variation in the tightening pressure along the imaginary circle causes undulation on the plane body along the imaginary circle, since the plane body at the screw bore areas sinks more than that at the intermediate areas between the screw bore areas. This undulation of the plane body is transferred to the magnetic disk which the periphery of the plane body contacts, so that the magnetic disk also suffers from undulation. The undulation of the magnetic disk causes undesirable effects when the magnetic head is intended to record or read out information in or out of the magnetic disk. In particular, the recent trend to reduce the flying height of the magnetic head above the magnetic disk in an HDD, for example, has brought difficulty unpreventing the magnetic head from interfering with the magnetic disk.

SUMMARY OF THE INVENTION

It is an object of the present invention to provide a recording disk apparatus capable of eliminating undulation of a recording disk by preventing deformation of a clamp in contact with the recording disk. It is another object of the present invention to provide a clamp capable of realizing such a recording disk apparatus.

According to a first aspect of the present invention, there is provided a recording disk apparatus comprising: a rotation axis having a flange: a recording disk surrounding the rotation axis; a clamp urging the recording disk against the flange; screws disposed along an imaginary circle concentric to the rotation axis so as to fix a plane body of the clamp at a tip end of the rotation axis; and a rigidity reduction mechanism reducing rigidity of the plane body at an intermediate area relative to screw bore areas, the intermediate area being defined between the screw bore areas along the imaginary circle.

When the clamp is fixed by the screws at the tip end of the rotation axis, tightening pressure is effected on the clamp at the screw bore areas. Since the rigidity of the plane body at the intermediate area is reduced relative to the screw bore areas in the above recording disk apparatus, the tightening pressure can equally be effected at the intermediate area, so that the clamp sinks toward the tip end of the rotation axis equally at the screw bore and intermediate areas. Therefore, the clamp is prevented from deformation so that undulation can be suppressed in the disk in contact with the clamp.

The aforementioned rigidity reduction mechanism may comprise an annular wall raised from a surface of the plane body, and a recess formed on the annular wall at a top face in said intermediate area. The rigidity of the plane body as a whole can be reinforced by the annular wall, while the rigidity at the intermediate area can relatively be reduced by the recess. Therefore, the clamp can be prevented from deformation as mentioned above.

The recess may comprise a tapered surface continuous, from the top surface. Employment of the tapered surface between the top surface and the recess enables employment of a press in forming the clamp. In this case, the clamp may be formed from metallic material such as aluminum or a stainless steel. It is preferable to select the metallic material in consideration of strength and rigidity of the clamp, and thermal expansion coefficient.

The recess may be defined by a curved surface. For example, formation of the curved surface between the bottom of the recess and the tapered surface and between the top surface of the annular wall and the tapered surface serves to avoid concentration of stress in such connection areas. As a result, the screws for fixing the clamp at the rotation axis can maintain the tightening pressure in a longer term.

In addition, the rigidity reduction mechanism may comprise an annular wall raised from a surface of the plane body, and a recess formed on the annular wall at a side (outer or inner) face in said intermediate area. The rigidity of the plane body as a whole can be reinforced by the annular wall, while the rigidity at the intermediate area can relatively be reduced by the recess. Therefore, the clamp can likewise be prevented from deformation. Moreover, the annular wall maintains continuous inner or outer surface so that an inner space within the annular wall can be reliably isolated from the outer space around the clamp. Accordingly, a balancer disposed within the inner space of the annular wall cannot fall off from the clamp toward the surrounding disk.

Further, the rigidity reduction mechanism may comprise a through hole formed in the plane body in the intermediate area. The through hole likewise serves to reduce the rigidity at the intermediate area, so that the clamp can be suppressed from deformation.

The rigidity reduction mechanism may comprise a large through hole in the middle of a pair of the screw bores, and a small through hole disposed in an area between the large through hole and the screw bore to have a diameter smaller, than that of the large through hole. Variation in the diameter of the through holes enables variation in rigidity of the plane body in the circumferential direction, leading to fine adjustment for the deformation of the clamp.

Furthermore, according to a second aspect of the present invention, there is provided a recording disk apparatus comprising: a rotation axis having a flange; a recording disk surrounding the rotation axis; a clamp urging the recording disk against the flange: screws disposed along an imaginary circle concentric to the rotation axis so as to fix a plane body of the clamp at a tip end of the rotation axis; and an annular wall raised from a surface of the plane body surrounding the screws to have a thickness larger than that of the plane body.

With the above recording disk apparatus, the rigidity of the clamp may be reinforced by the annular wall surrounding the screw bore areas, while the rigidity is relatively reduced at the screw bore areas in the plane body. Therefore, when tightening pressure is effected from the screws, it is absorbed around the screw bore areas in the plane body. The plane body can be prevented from deformation at the periphery surrounding the screw bore areas, where the annular wall is formed. Thus, the disk faces of the recording disk can be maintained flat.

It should be noted that the aforementioned clamps may be distributed dependent or independent of a recording disk apparatus.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
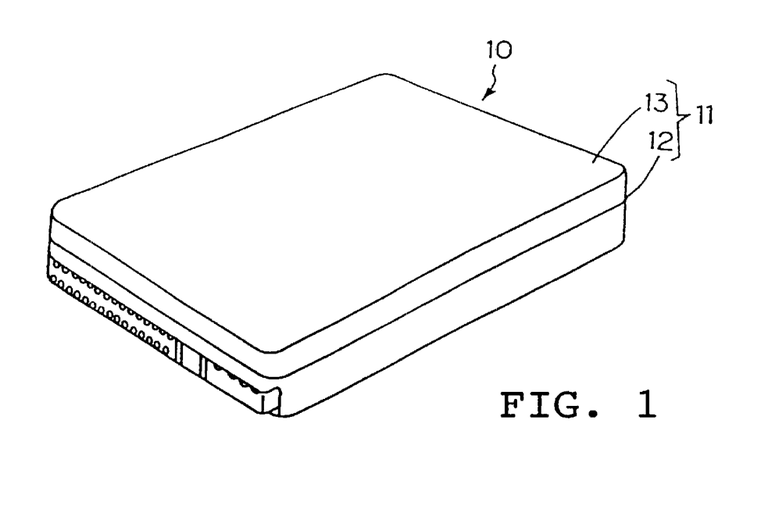
FIG. 1 is a perspective view illustrating a hard disk drive unit (HDD)

FIG. 1 illustrates a hard disk drive unit (HDD) 10 as an example of a recording disk apparatus. The HDD 10 comprises a housing 11 formed by a combination of a box-shaped housing body 12 and a cover 13 for closing an opening defined in the housing body 12. The HDD 10 may be assembled into a computer housing, for example, or be used as an exterior storage device independent of the computer housing.

Figure 2:
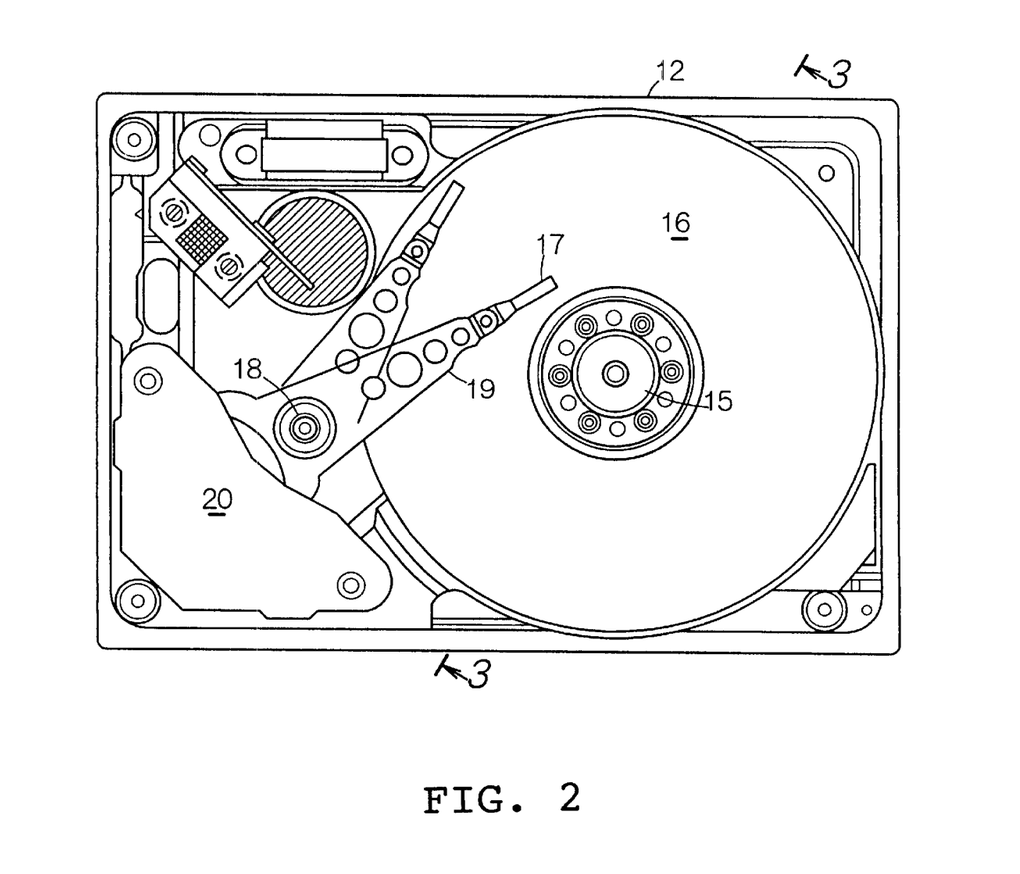
FIG. 2 is a plan view illustrating the inner structure of the HDD.

As shown in FIG. 2, the housing 10 serves to accommodate a magnetic disk 16 surrounding a rotation axis 15, and a magnetic head 17 opposed to a disk face of the magnetic disk 16. The magnetic head 17 is attached on the tip end of a carriage arm 19 which is capable of swinging about a swinging axis 18. When information is recorded or read out in or out of the magnetic disk 16, an actuator 20 comprising a magnetic circuit drives the carriage arm 19 for swinging movement so as to position the magnetic head 17 at a target recording track on the disk face of the magnetic disk 16.

Figure 3:
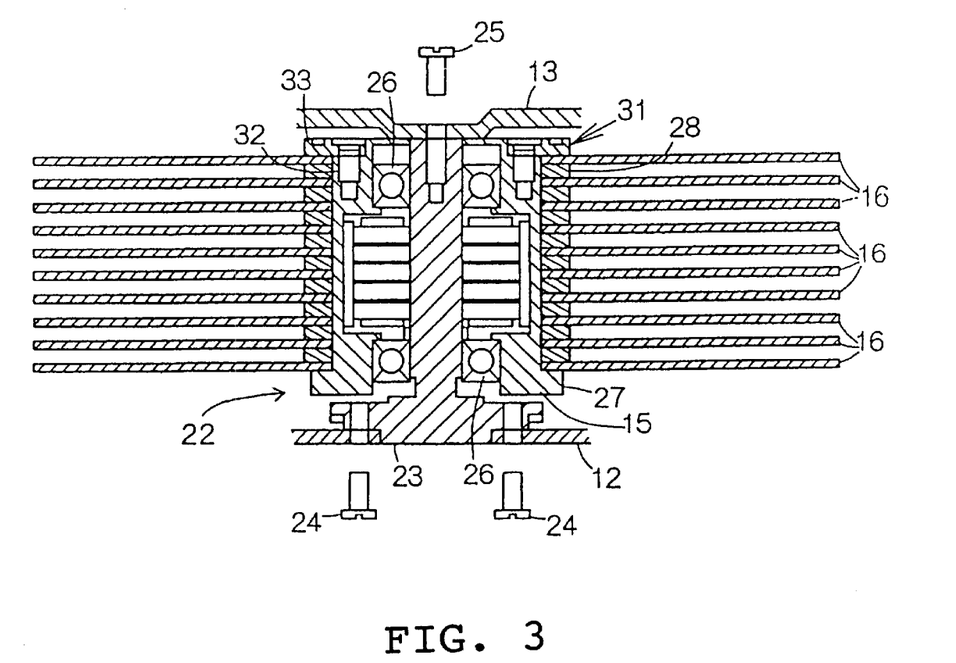
FIG. 3 is a partial enlarged sectional view taken along the line 3—3 in FIG. 2.

As is apparent from FIG. 3, a spindle motor 22 is magnetically connected to the rotation axis 15. A stationary axis 23 of the spindle motor 22 is fixed to the housing 11. Screws 24 serve to fix the base end of the stationary axis 23 on the bottom wall of the housing body 12. When the cover 13 is coupled to the housing body 12, the tip end of the stationary axis 23 is coupled to the cover 13 by a screw 25.

The rotation axis 15 is connected to the stationary axis 23 via ball bearings 26 for relative rotation therebetween. An outward flange 27 is formed on the base end of the rotation axis 15 so as to receive the magnetic disks 16 and spacer rings 28 which are superposed alternately. Employment of the spacer rings 28 serves to arrange the magnetic disks 16 at equal intervals in the axial direction.

A clamp 31 is fixed at the tip end of the rotation axis 15. The clamp 31 serves to urge the alternately superposed magnetic disks 16 and spacer rings 28 against the outward flange 27. A plurality of screws 32 are adapted to fix a plane body 33 of the clamp 31 at the tip end of the rotation axis 15. The screws 32 are arranged at equal intervals on an imaginary circle concentric to the rotation axis 15.

Figure 4:
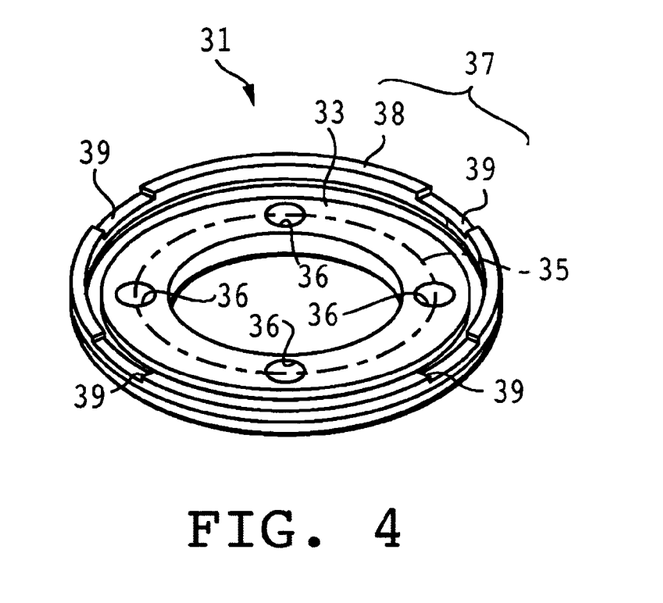
FIG. 4 is a perspective view illustrating a clamp according to a first embodiment of the present invention.

FIG. 4 illustrates the clamp 31 according to a first embodiment of the present invention. The plane body 33 of the clamp 31 is provided with a plurality of screw bores 36 arranged along the imaginary circle 35. The respective screw bores 36 receive the corresponding screws 32.

The clamp 31 is provided with a rigidity reduction mechanism 37 for reducing rigidity of the plane body 35 ant the intermediate areas between the screw bore areas along the imaginary circle 35, relative to rigidity at the screw bore areas. The rigidity reduction mechanism 37 comprises an annular wall 38 raised from the surface of the plane body 33 at its periphery for reinforcing the rigidity of the plane body 33, and recesses 39 formed on the annular wall 38 at its top face in the intermediate areas.

The recesses 39 serve to reduce the rigidity of the annular wall 38 at the intermediate areas in this rigidity reduction mechanism 37. Therefore, even if the tightening pressure from the screws 32 causes upward force at the intermediate areas, the upward force is absorbed by elasticity at the intermediate areas. As a result, deformation of the clamp 31 can be prevented so that undulation or deformation of the magnetic disk 16 in contact with the periphery of the clamp 31 can be avoided.

Figure 5:
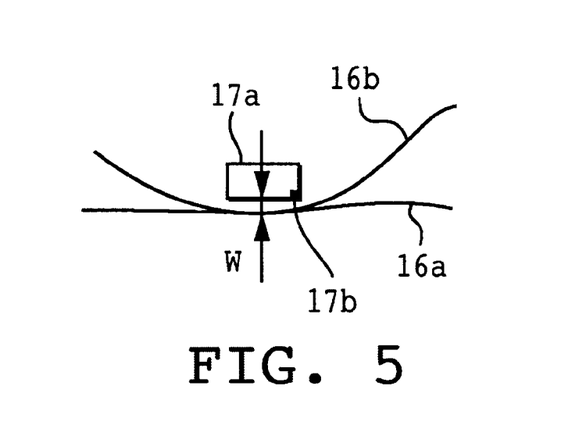
FIG. 5 illustrates a relationship between a flying slider of the magnetic head and a disk face of the magnetic disk.

The flying height W of the flying slider 17a for the magnetic head 17 is determined by the flying amount at the center of the flying slider 17a, as shown in FIG. 5. If undulation of the magnetic disk 16a can be avoided, less possibility remains in interference between the magnetic disk 16a and the head element 17b at the rear of the flying slider 17a. On the other hand, if the magnetic disk 16b suffers from undulation, enough flying height W the flying slider 17a cannot reliably prevent the head element 17b from interfering with the magnetic disk 16b.

In particular, the magnetic disk 16b is supposed to suffer from larger undulation at an inner area nearest to the clamp 31. Since the circumferential velocity tends to become slower at such inner area so that the flying height W of the flying slider 17a tends to get smaller, the probability of the interference is multiplied. The function of the rigidity reduction mechanism 37 serves to reduce the flying height W of the flying slider 17a without interference between the head element 17b and the magnetic disk 16a.

The clamp 31 may be formed by pressing a sheet of aluminum or a stainless steel, by cold forging a bulk of Duralumin (trademark), or the like. It is preferable to select material for the clamp 31 in consideration of strength and rigidity in the formed clamp 31, and thermal expansion coefficient. For example, aluminum may be selected if the magnetic disk 16 employs an aluminum disk substrate, and a stainless steel may be selected if the magnetic disk 16 employs a glass disk substrate.

Figure 6:
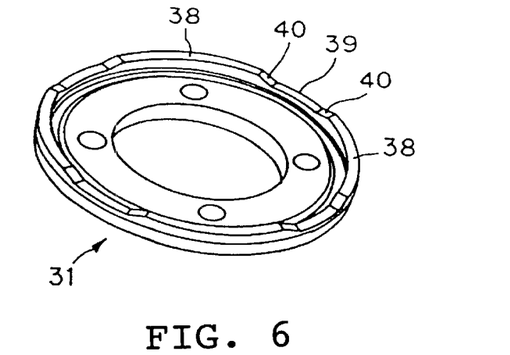
FIG. 6 is a perspective view illustrating a modification of the recesses in the clamp.
Figure 7:
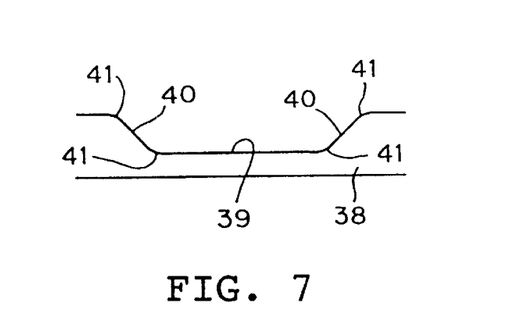
FIG. 7 is a side view illustrating a further modification of the recesses in the annular wall.

If a press is employed in forming the clamp 31, tapered surfaces 40 may be formed in the recesses 39 to be continuous from the top surface of the annular wall 38 as shown in FIG. 6, for example. The tapered surfaces 40 are adapted to facilitate the forming of the recesses 39 by a press. In addition, curved surfaces 41 may be formed at connection between the bottom of the recess 39 and the tapered surfaces 40 and at connection between the top surface of the annular wall 38 and the tapered surfaces 40, as shown in FIG. 7. The curved surfaces 41 serve to prevent concentration of stress around the connection between the bottom of the recess 39 and the tapered surfaces 40 and the connection between the top surface of the annular wall 38 and the tapered surfaces 40. Accordingly the tightening pressure may be maintained constant from the screws 32 for a longer term when the clamp 31 is fixed to the rotation axis 15.

Figure 8:
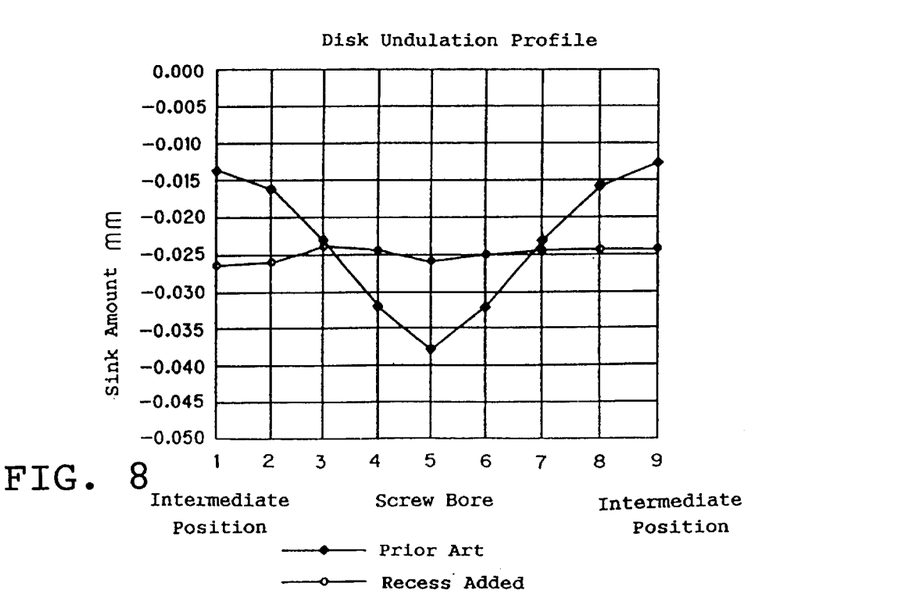
FIG. 8 is a graph illustrating undulation profiles of the magnetic disk.

FIG. 8 illustrates undulation profiles for the aluminum magnetic disk 16 of 0.8 mm thickness urged by the clamp 31. The vertical axis defines the amount of sink generated on the magnetic disk 16 by the tightening pressure from the screws 32. The amount of sink is measured from zero level which is defined by a level of the disk surface of the magnetic disk 16 without tightening pressure from the clamp 31. Undulation profile of the magnetic disk 16 is measured at periphery of the clamp 31. The horizontal axis defines the circumferential positions divided at equal intervals around the periphery of the clamp 31 on the magnetic disk 16.

As is apparent from FIG. 8, in case where the magnetic disk 16 is fixed with a prior art clamp without recesses in the annular wall, the magnetic disk 16 suffers from undulation having the amplitude of about 25 micrometers between the screw bore areas and the intermediate areas. On the other hand, in case where the magnetic disk 16 is fixed with the clamp 31 with the recesses 39 in the annular wall 38 as shown in FIG. 6, undulation can be suppressed to about 3 micrometers, although the magnetic disk 16 generates constant sink of 25 micrometers all around the periphery of the clamp 31. Accordingly, it proves that the recesses 39 serve to reduce the rigidity of the annular wall 38 so as to keep the disk face of the magnetic disk 16 flat.

Figure 9:
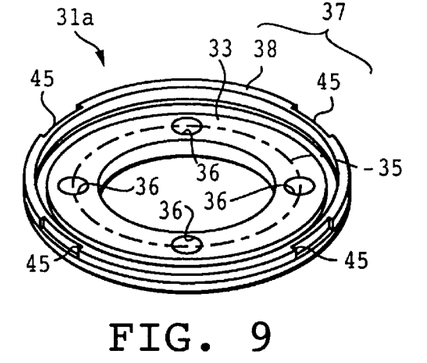
FIG. 9 is a perspective view illustrating a clamp according to a second embodiment of the present invention.

FIG. 9 illustrates a clamp 31a according to a second embodiment of the present invention. In this embodiment, the rigidity reduction mechanism 37 comprises recesses 45 formed on the annular wall 38 at its side face or outer face at the intermediate areas. The recesses 45 serve to reduce the rigidity of the annular wall 38 at the intermediate areas in the same manner as the aforementioned first embodiment, so that the disk face of the magnetic disk 16 is kept flat. The identical reference numerals or characters are attached to the structure achieving the same effect or function as of the aforementioned first embodiment, and the detailed description thereof may be omitted.

Figure 10:
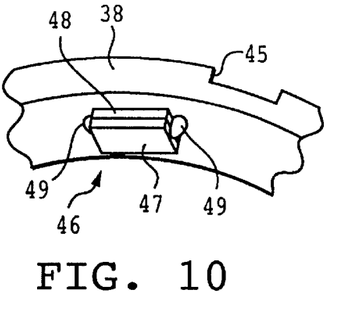
FIG. 10 is a partial enlarged view illustrating the annular wall.

A balancer 46 may be attached to the clamp 31a, as shown in FIG. 10, for providing the rotating magnetic disk 16 with uniform centrifugal force so as to suppress vibration of the rotating magnetic disk 16. The balancer 46 may be formed by superposing a stainless steel layer 47 and an adhesive layer 48. An adhesive 49 serves to attach the balancer 46 to the inner surface of the annular wall 38. The annular wall 38 maintains a continuous inner surface irrespective of the recesses 45 so as to isolate the inner space of the annular wall 38 from the surrounding outer space, so that the balancer 46 which happens to fall off from the annular wall 38 cannot fall out of the clamp 31a toward the surrounding disk face of the magnetic disk 16.

Figure 11:
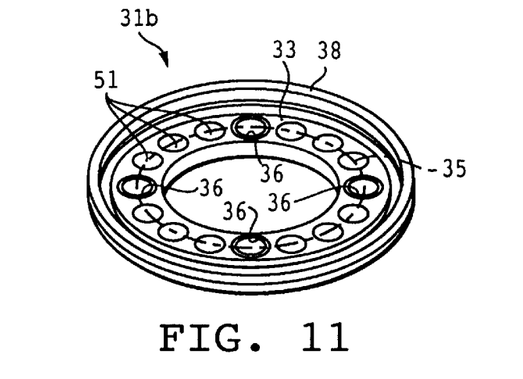
FIG. 11 is a perspective view illustrating a clamp according to a third embodiment of the present invention.

FIG. 11 illustrates a clamp 31b according to a third embodiment of the present invention. In this third embodiment, the rigidity reduction mechanism 37 comprises through holes 51 formed in the plane body 33 at the intermediate areas defined between the screw bore areas along the imaginary circle 35. One through hole 51 may be disposed in every intermediate area, or a plurality of through holes 51 may be disposed in every intermediate area as shown in FIG. 11. The clamp 31b serves to reduce the rigidity of the plane body 33 at the intermediate areas in the same manner as the aforementioned first and second embodiments, so that the disk face of the magnetic disk 16 is kept flat. The identical reference numerals or characters are attached to the structure achieving the same effect or function as of the aforementioned first and second embodiments, and the detailed description thereof may be omitted.

Figure 12:
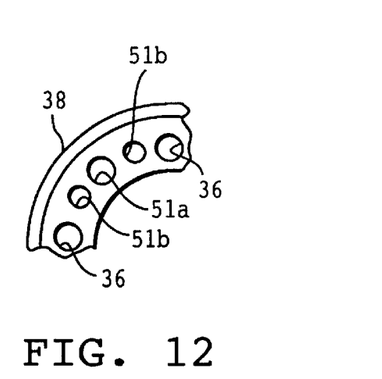
FIG. 12 is a partial enlarged plan view illustrating the plane body.

In case a plurality of through holes 51 are formed in every intermediate area, through holes 51a, 51b of different diameters may be formed as shown in FIG. 12. More specifically, the large through hole 51a is formed in the middle of a pair of the screw bores 36, and the small through holes 51b having the diameter smaller than that of the large through hole 51a are disposed in areas between the large through hole 51a and the screw bores 35. The through holes 51a, 51b serve to vary the rigidity of the plane body 33 in the circumferential direction, so that it is possible to precisely adjust the deformation of the plane body 33.

Figure 13:
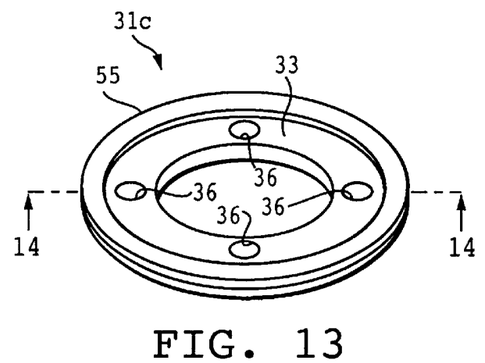
FIG. 13 is a perspective view illustrating a fourth embodiment of the present invention.
Figure 14:
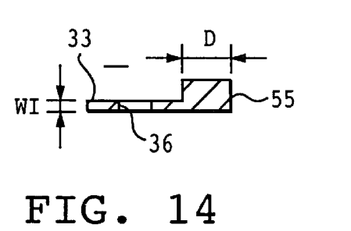
FIG. 14 is a partial enlarged sectional view taken along the line 14—14 in FIG. 13.

FIG. 13 illustrates a clamp 31c according to a fourth embodiment of the present invention. In this fourth embodiment, an annular wall 55 is formed to rise from the periphery of the plane body 33. The wall thickness D of the annular wall 55 is larger than the wall thickness WI of the plane body 33 as shown in FIG. 14. The rigidity of the plane body 33 is reinforced at the periphery of the plane body in contact with the magnetic disk 16, while the rigidity is relatively reduced in area around the screw bores 36. As a result, when tightening pressure is effected from the screws 32, it is absorbed at the screw bore areas so that the deformation of the plane body 33 at the periphery may be suppressed by the thicker annular wall 55. The disk face of the magnetic disk 16 is kept flat. The clamp 31c may be formed by grinding a bulk of metallic material. The identical reference numerals or characters are attached to the structure achieving the same effect or function as of the aforementioned first embodiment, and the detailed description thereof may be omitted.

What is claimed is:

1. A recording disk apparatus comprising:
    a rotation axis having a flange;
    a recording disk surrounding the rotation axis;
    a clamp urging the recording disk against the flange;
    screws extending through a plane body of the clamp so as to fix the plane body at a tip end of the rotation axis, said screws disposed along an imaginary circle concentric to the rotation axis;
    a continuous annular wall extending on an upper surface of the plane body; and
    a rigidity reduction mechanism reducing rigidity of the plane body at intermediate areas relative to screw bore areas, said intermediate areas defined between adjacent screw bore areas along the imaginary circle, wherein said rigidity reduction mechanism comprises recesses formed on the annular wall at a top face in said intermediate areas.

2. A recording disk apparatus comprising:

a rotation axis having a flange;

a recording disk surrounding the rotation axis;

a clamp urging the recording disk against the flange;

screws extending through a plane body of the clamp so as to fix the plane body at a tip end of the rotation axis, said screws disposed along an imaginary circle concentric to the rotation axis;

a continuous annular wall extending on an upper surface of the plane body; and a rigidity reduction mechanism reducing rigidity of the plane body at intermediate areas relative to screw bore areas, said intermediate areas defined; between adjacent screw bore areas along the imaginary circle, wherein said rigidity reduction mechanism comprises recesses formed on the annular wall at a side face in said intermediate areas.

3. A clamp for a recording disk apparatus, comprising:

a plane body with screw bores arranged along an imaginary circle;

a continuous annular wall extending on an upper surface of the plane body so as to surround the screw bores; and a rigidity reduction mechanism reducing rigidity of the plane body at intermediate areas relative to screw bore areas, said intermediate areas defined between adjacent screw bore areas along the imaginary circle, wherein said rigidity reduction mechanism comprises recesses formed on the annular wall at a top face in said intermediate areas.

4. The clamp according to claim 3, wherein each of said recesses is defined by a curved surface.

5. The clamp according to claim 3, wherein each of said recesses comprises a tapered surface continuous from said top surface.

6. The clamp according to claim 5, wherein each of said recesses is defined by a curved surface.

7. A clamp for a recording disk apparatus, comprising:

by a plane body with screw bores arranged along an imaginary circle;

a continuous annular wall extending on an upper surface of the plane body so as to surround the screw bores; and a rigidity reduction mechanism reducing rigidity of the plane body at intermediate areas relative to screw bore areas, said intermediate areas defined between adjacent screw bore areas along the imaginary circle, wherein said rigidity reduction mechanism comprises recesses formed on the annular wall at a side face in said intermediate areas.

\* \* \* \* \*

UNITED STATES PATENT AND TRADEMARK OFFICE
CERTIFICATE OF CORRECTION

PATENT NO. : 6,504,674 B2
DATED : January 7, 2003
INVENTOR(S) : Yoshida et al.

It is certified that error appears in the above-identified patent and that said Letters Patent is hereby corrected as shown below:

<u>Column 8,</u>
Line 17, delete "by".

Signed and Sealed this

Twenty-ninth Day of July, 2003

JAMES E. ROGAN
*Director of the United States Patent and Trademark Office*